US011811562B2

(12) United States Patent
Hosseinian et al.

(10) Patent No.: US 11,811,562 B2
(45) Date of Patent: Nov. 7, 2023

(54) INTERFERENCE REDUCTION FOR REFERENCE SYMBOLS IN URLLC/EMBB MULTIPLEXING

(71) Applicant: InterDigital Patent Holdings, Inc., Wilmington, DE (US)

(72) Inventors: Seyed Mohsen Hosseinian, San Diego, CA (US); Oghenekome Oteri, San Diego, CA (US); Liangping Ma, San Diego, CA (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 141 days.

(21) Appl. No.: 16/482,343

(22) PCT Filed: Feb. 1, 2018

(86) PCT No.: PCT/US2018/016332
§ 371 (c)(1),
(2) Date: Jul. 31, 2019

(87) PCT Pub. No.: WO2018/144660
PCT Pub. Date: Aug. 9, 2018

(65) Prior Publication Data
US 2020/0052864 A1 Feb. 13, 2020

Related U.S. Application Data

(60) Provisional application No. 62/454,243, filed on Feb. 3, 2017, provisional application No. 62/519,688, filed on Jun. 14, 2017.

(51) Int. Cl.
*H04L 25/02* (2006.01)
*H04L 5/00* (2006.01)
*H04L 27/26* (2006.01)

(52) U.S. Cl.
CPC ........ *H04L 25/0204* (2013.01); *H04L 5/0044* (2013.01); *H04L 5/0048* (2013.01);
(Continued)

(58) Field of Classification Search
CPC ..................................................... H04L 5/0062
See application file for complete search history.

(56) References Cited

U.S. PATENT DOCUMENTS 10,667,267 B2 * 5/2020 Li ....................... H04W 52/245
2012/0134316 A1 5/2012 Seo et al.
(Continued)

FOREIGN PATENT DOCUMENTS

CN 101212757 A 7/2008
CN 102326347 A 1/2012
(Continued)

OTHER PUBLICATIONS

Cheol Y. Park, UL Control, specification of U.S. Appl. No. 62/425,400, filed Nov. 2016, pp. 31 (Year: 2016).*
(Continued)

*Primary Examiner* — Jung H Park
(74) *Attorney, Agent, or Firm* — CONDO ROCCIA KOPTIW LLP

(57) ABSTRACT

Interference for reference symbols in URLLC/eMBB multiplexing may be reduced. URLLC and/or eMBB reference signal (RS) interference may be reduced regardless whether the URLLC and eMBB reference signals and data are multiplexed and superimposed using the same numerology or different numerologies and/or regardless whether the URLLC and eMBB reference signals may be aligned or misaligned (e.g., may or may not use a common resource). An URLLC transmission may preempt an eMBB transmission. For the URLLC and eMBB transmissions using a same numerology, a RS reuse indication may be used. The RS
(Continued)

reuse indication may indicate whether a RS in the preempted portion of the eMBB transmission may be reused. A channel estimation function set may be estimated, and channel estimation may be performed using the determined channel estimation function set. The eMBB transmission and the URLLC transmission may be decoded based on the performed channel estimation.

20 Claims, 16 Drawing Sheets

(52) U.S. Cl.
CPC ........ *H04L 5/0062* (2013.01); *H04L 25/0202* (2013.01); *H04L 27/2613* (2013.01); *H04L 27/26025* (2021.01); *H04L 27/26035* (2021.01)

(56) References Cited

U.S. PATENT DOCUMENTS

| | | | | |
|---|---|---|---|---|
| 2013/0301451 | A1* | 11/2013 | Siomina | H04B 17/318 370/252 |
| 2014/0245114 | A1 | 8/2014 | Thaler et al. | |
| 2014/0314000 | A1* | 10/2014 | Liu | H04W 52/365 370/329 |
| 2015/0319718 | A1* | 11/2015 | Yang | H04W 72/0406 370/252 |
| 2017/0086087 | A1 | 3/2017 | Kim et al. | |
| 2017/0135099 | A1* | 5/2017 | Song | H04W 16/02 |
| 2017/0142591 | A1* | 5/2017 | Vrzic | H04L 47/2408 |
| 2017/0164349 | A1* | 6/2017 | Zhu | H04W 28/0247 |
| 2017/0201968 | A1* | 7/2017 | Nam | H04W 72/042 |
| 2017/0231011 | A1* | 8/2017 | Park | H04W 74/006 |
| 2018/0035446 | A1* | 2/2018 | Li | H04W 72/1236 |
| 2018/0054788 | A1* | 2/2018 | Kwon | H04W 56/002 |
| 2018/0092086 | A1* | 3/2018 | Nammi | H04L 5/003 |
| 2018/0145818 | A1* | 5/2018 | Choi | H04L 5/0051 |
| 2018/0184431 | A1* | 6/2018 | Li | H04W 52/243 |
| 2018/0184444 | A1* | 6/2018 | Li | H04W 72/0406 |
| 2019/0349960 | A1* | 11/2019 | Li | H04W 72/1242 |
| 2021/0067302 | A1 | 3/2021 | Wang et al. | |

FOREIGN PATENT DOCUMENTS

| | | |
|---|---|---|
| CN | 104782054 A | 7/2015 |
| CN | 105099606 A | 11/2015 |
| CN | 106134241 A | 11/2016 |
| CN | 106330789 A | 1/2017 |
| KR | PCT/KR2017/013319 | * 12/2016 |
| WO | 2015/021185 A1 | 2/2015 |

OTHER PUBLICATIONS

Li et al., Specification of U.S. Appl. No. 62/443,497 for US 2019/0349960, "Mechanisms for efficient access and transmission in NR", filed Jan. 2017, pp. 48 (Year: 2017).*
Li et al., Specification of U.S. Appl. No. 62/453,855 for US 2019/0349960, "Mechanisms for efficient access and transmission in NR", filed Feb. 2017, pp. 53 (Year: 2017).*
Li et al., Drawings of U.S. Appl. No. 62/443,497 for US 2019/0349960, "Mechanisms for efficient access and transmission in NR", filed Jan. 2017, pp. 33 (Year: 2017).*
Li et al., Drawings of U.S. Appl. No. 62/453,855 for US 2019/0349960, "Mechanisms for efficient access and transmission in NR", filed Jan. 2017, pp. 19 (Year: 2017).*
3rd Generation Partnership Project (3GPP), R1-1700512, "Discussion on Multiplexing of eMBB and URLLC", LG Electronics, TSG RAN WG1 NR Ad-hoc Meeting, Spokane, USA, Jan. 16-20, 2017, 10 pages.
3rd Generation Partnership Project (3GPP), TR 38.913 V14.0.0, "Technical Specification Group Radio Access Network, Study on Scenarios and Requirements for Next Generation Access Technologies (Release 14)", Oct. 2016, pp. 1-39.
3rd Generation Partnership Project (3GPP), R1-1612540,"eMBB and URLLC Multiplexing in DL", Samsung, 3GPP TSG RAN WG1 Meeting #87, Reno, USA, Nov. 14-18, 2016, 5 pages.
3rd Generation Partnership Project (3GPP), R1-1700374, "Downlink Multiplexing of eMBB and URLLC Transmission", Intel Corporation, 3GPP TSG RAN WG1 NR Ad-Hoc Meeting, Spokane, USA, Jan. 16-20, 2017, 12 pages.
3rd Generation Partnership Project (3GPP), R1-1700380, "Mini-Slot Length and Start Time for URLLC", Intel Corporation, 3GPP TSG RAN WG1 NR Ad-Hoc Meeting, Spokane, USA, Jan. 16-20, 2017, 4 pages.
3rd Generation Partnership Project (3GPP), R1-1700442, "Discussion on eMBB/URLLC Multiplexing", CMCC, 3GPP TSG RAN WG1 NR adhoc Meeting, Spokane, USA, Jan. 16-20, 2017, 4 pages.
3rd Generation Partnership Project (3GPP), R1-1700642, "On Dynamic Resource Sharing Between URLLC and eMBB in DL", Sequans Communications, 3GPP TSG RAN WG1 AH_NR Meeting, Spokane, USA, Jan. 16-20, 2017, 6 pages.

* cited by examiner

INTERFERENCE REDUCTION FOR REFERENCE SYMBOLS IN URLLC/EMBB MULTIPLEXING

CROSS-REFERENCE TO RELATED APPLICATIONS

This application is the National Stage entry under 35 U.S.C. § 371 of Patent Cooperation Treaty Application PCT/US2018/016332, filed Feb. 1, 2018, which claims the benefit of U.S. Provisional Application Ser. No. 62/454,243 filed Feb. 3, 2017 and U.S. Provisional Application Serial No. 62/519,688 filed Jun. 14, 2017, the contents of which are incorporated by reference herein.

BACKGROUND

Mobile communications continue to evolve. A fifth generation may be referred to as 5G. A previous (legacy) generation of mobile communication may be, for example, fourth generation (4G) long term evolution (LTE). Mobile wireless communications implement a variety of radio access technologies (RATs), such as New Radio (NR). Use cases for NR may include, for example, extreme Mobile Broadband (eMBB), Ultra High Reliability and Low Latency Communications (URLLC), and massive Machine Type Communications (mMTC).

SUMMARY

Systems, methods and instrumentalities are disclosed for interference reduction for reference symbols (e.g., URLLC reference symbols), for example in URLLC/eMBB multiplexing. Reference signal (RS) reuse indication may be used. URLLC and/or eMBB reference signal interference may be reduced regardless whether URLLC and eMBB reference signals and data are multiplexed and/or superimposed using the same numerology or different numerologies and/or regardless whether URLLC and eMBB reference signals may be aligned or misaligned (e.g., may or may not use a common resource).

A wireless transmit/receive unit (WTRU) may receive a transmission. For example, the WTRU may receive an eMBB transmission from a network entity. The network entity may include a gNodeB. The WTRU may receive an indication associated with the eMBB transmission. The indication may include a preemption indication and/or a reference signal (RS) reuse indication. The preemption indication may indicate that an URLLC transmission preempts a portion of the eMBB transmission. The URLLC transmission may be superposed in the eMBB transmission. In examples, the URLLC transmission may be superposed in the eMBB transmission using a same numerology. In examples, the URLLC transmission may be superposed in the eMBB transmission using a different numerology. The RS reuse indication may indicate whether a RS in the preemption portion of the eMBB transmission can or cannot be reused (e.g., the indication may indicate an extent of reuse).

The eMBB transmission may be received in a first slot. The indication may be received in a second slot. In examples, the second slot may be a next slot after the first slot. In examples, the second slot may be the same slot as the first slot. The indication may be received in a downlink control information (DCI) associated with the second slot. The WTRU may determine a channel estimation function set based on the RS reuse indication. In examples, if the RS reuse indication indicates that the RS in the preempted portion of the eMBB transmission can be reused, the WTRU may determine a channel estimation function set associated with a level of reuse indicated by the RS reuse indication.

The level of reuse may include a first level of reuse or a second level of reuse. The first level of reuse may be associated with a first channel estimation function set. The second level of reuse may be associated with a second channel estimation function set. The first channel estimation function set may comprise a path-loss estimation (PLEST). The second channel estimation function set may comprise the PLEST and a Doppler-timing estimation (DEST). The level of reuse may include (e.g., further include) a third level of reuse. The third level of reuse may be associated with a third channel estimation function set. The third channel estimation function set may include a full channel estimation.

In examples, if the RS reuse indication indicates that the RS in the preempted portion of the eMBB transmission cannot be reused, the WTRU may ignore the RS for the channel estimation. For example, the WTRU may not use the RS in the preempted resource.

The WTRU may perform channel estimation using the determined channel estimation function set. The WTRU may decode the eMBB transmission and the URLLC transmission.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
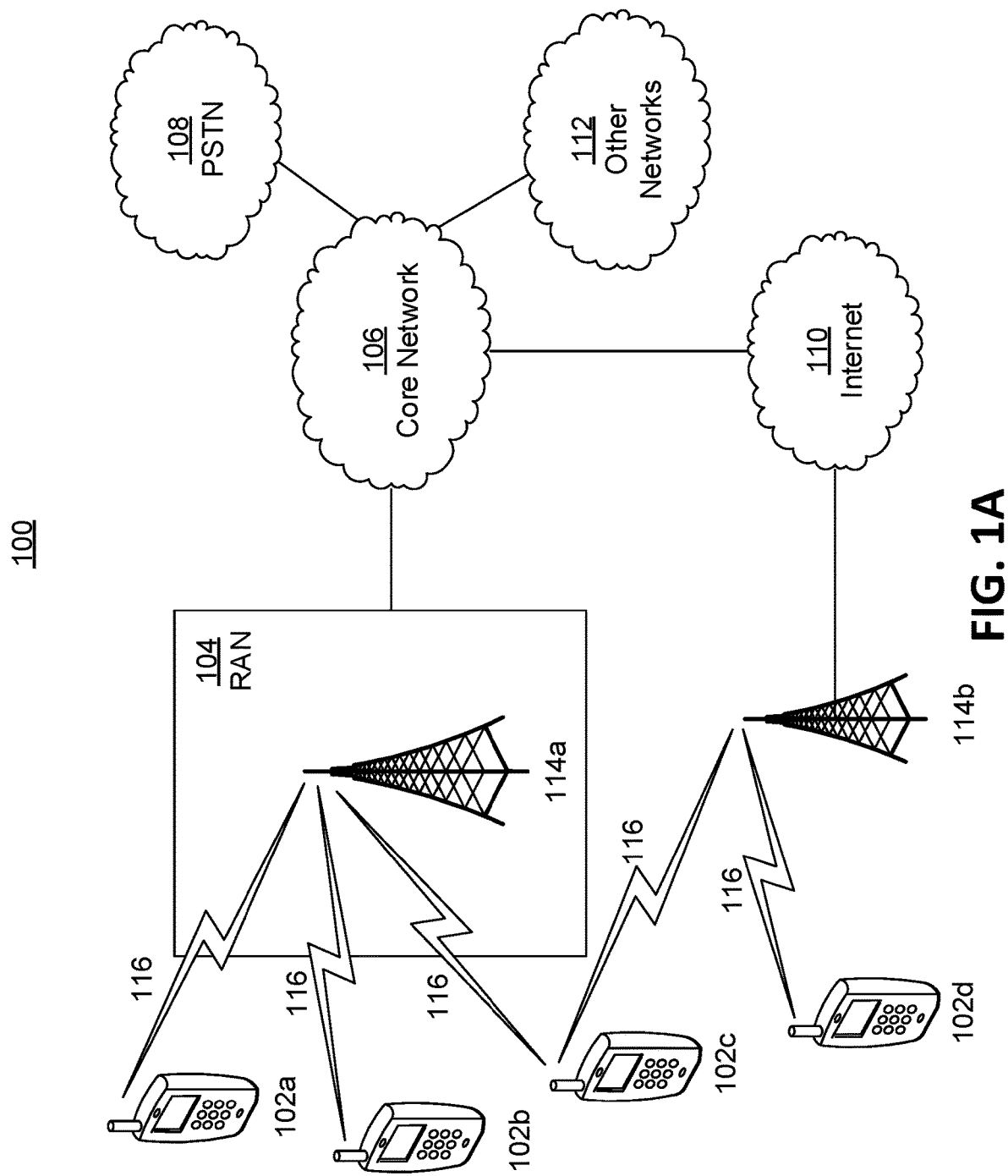
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
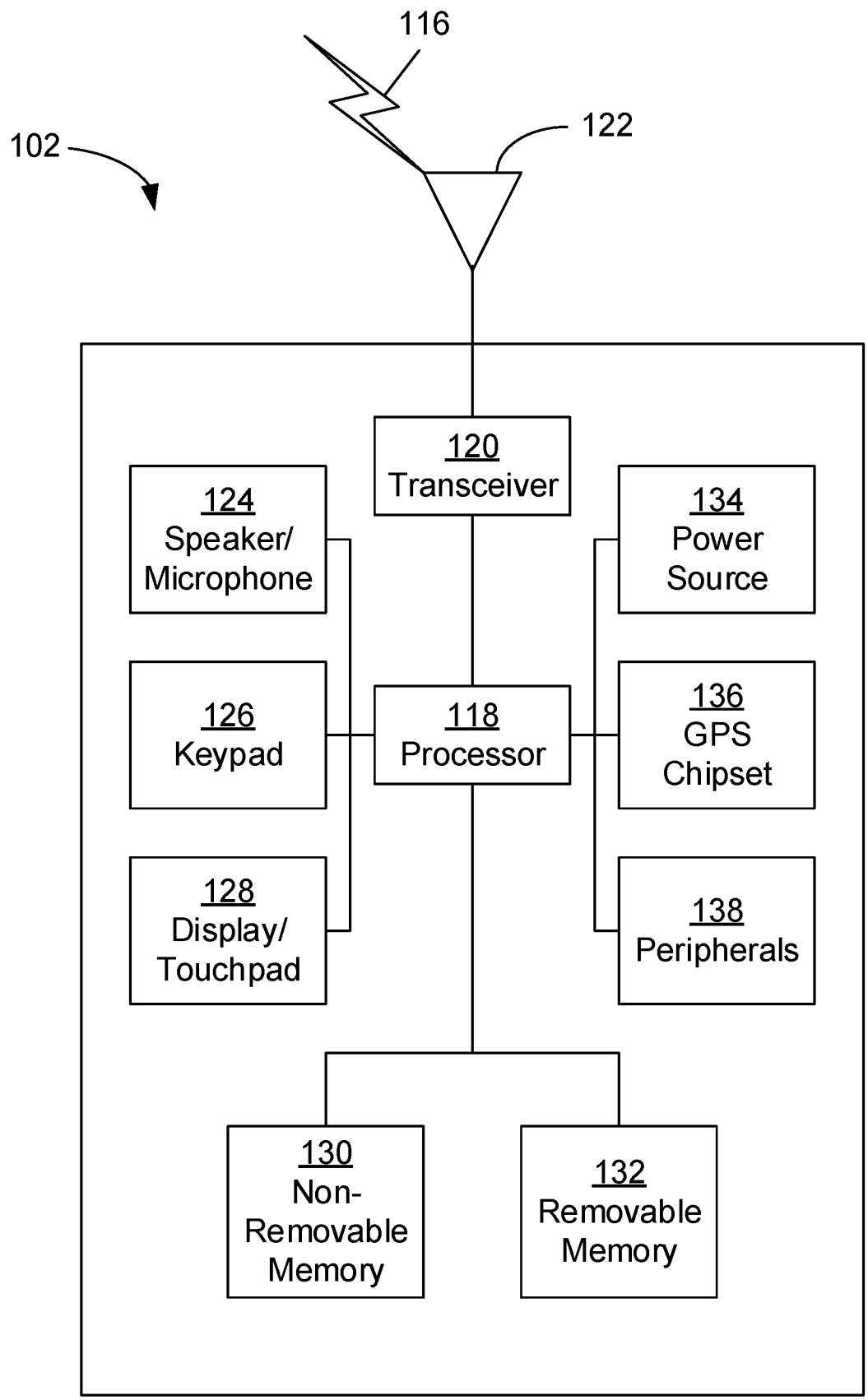
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
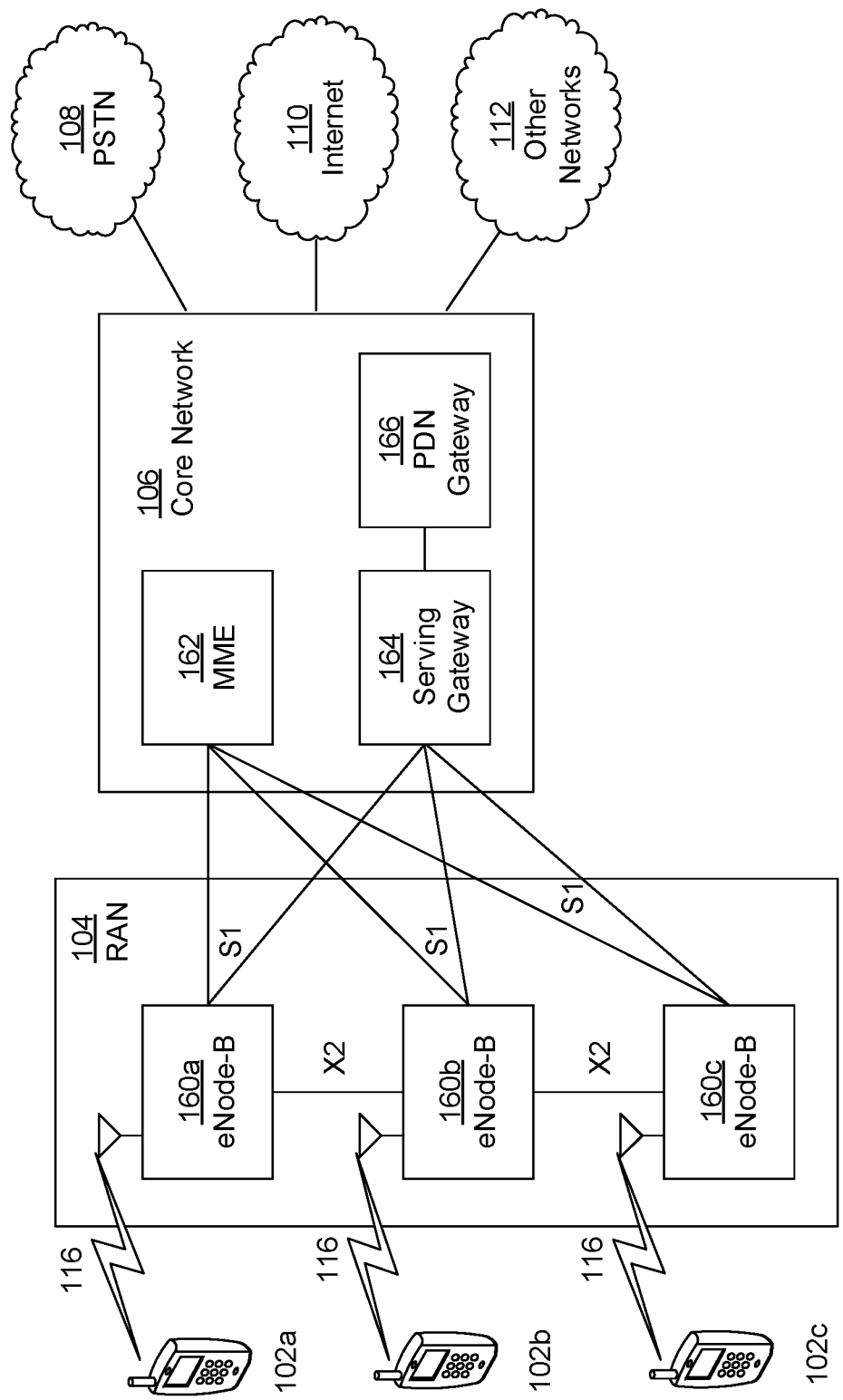
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
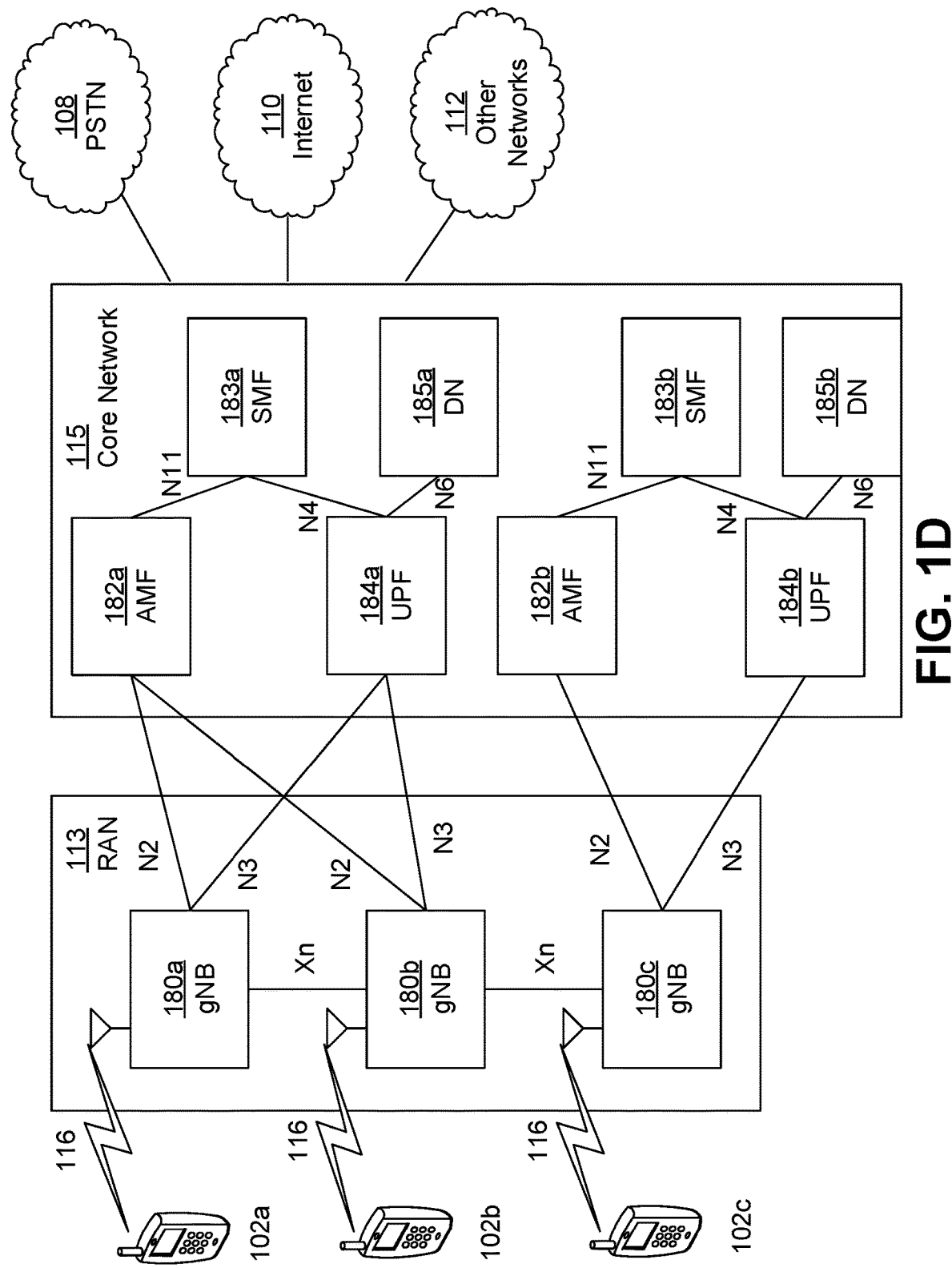
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Example use cases for 5G may include, for example, Ultra-Reliable Low Latency Communications (URLLC), enhanced Mobile Broadband (eMBB), and massive Machine Type Communications (mMTC). URLLC may have high reliability and very low latency.

In an example (e.g., for NR), URLLC and eMBB user plane may have a delay of 0.5 ms and 4 ms, respectively. For example, URLLC may transmit X bytes of data within 0.5 ms with $10^{-5}$ error rate. URLLC traffic may have packet sizes that range from, for example, several tens of bytes to several hundreds of bytes. Traffic may be sporadic and may be multiplexed with eMBB traffic.

NR may support multiple numerology and flexible frame structures. URLLC and eMBB traffic may be multiplexed with different numerologies (e.g., in the same carrier). URLLC and eMBB traffic may be multiplexed in different schemes, such as frequency-division multiplexing (FDM), time-division multiplexing (TDM), FDM and TDM, and/or resource overlapping.

Resource overlapping maybe implemented, for example, by preemption or superposition. In an example of preemption, a region within eMBB allocated resources may be punctured and URLLC resources may be placed. In an example of superposition, URLLC resources may be superposed (e.g., added) to eMBB resources (e.g., URLLC and/or eMBB resources may be transmitted).

Figure 2:
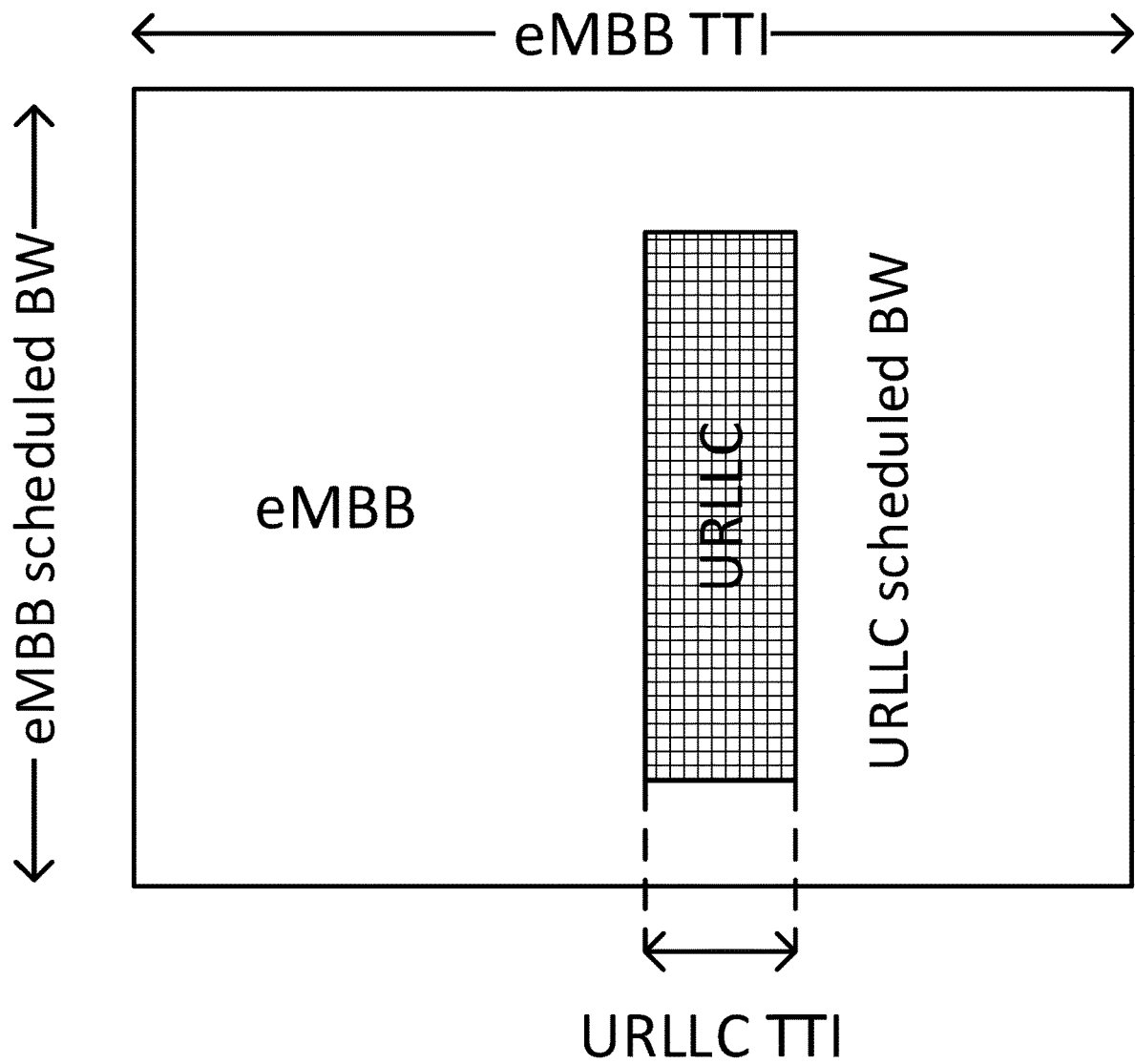
FIG. 2 is an example of eMBB/URLLC multiplexing using superposition.

FIG. 2 shows an example of multiplexing URLLC resources over eMBB resources using a superposition. URLLC may overlap with a portion of eMBB resources. For example, URLLC may overlap with a small portion of eMBB resources. eMBB and URLLC receivers may suffer from interference effects caused by superposition. Interference effects may be overcome, for example, by applying interference suppression techniques, such as minimum mean-squared error interference rejection combining (MMSE-IRC), symbol-level interference cancellation (IC), interference aware detection, etc. A gNB may reduce the amount of interference, for example, by controlling one or more superposition parameters, such as a power ratio between a superposed URLLC and eMBB symbols. Power allocated to an URLLC transmission in an overlapped superposed region may be higher (e.g., significantly higher) than power allocated to eMBB transmission, for example, given that URLLC transmission may have more stringent reliability requirements than eMBB transmission.

Receiver detection performance for URLLC and eMBB may suffer due to interference caused by superposition. URLLC reliability may be higher than eMBB reliability. Power ratio control or other approaches may be used to increase the performance of interference suppression by an URLLC receiver. This may decrease the amount of interference to URLLC data channel resources, e.g., including data and reference symbol resources. Precise channel estimation may be needed for highly reliable detection of a URLLC signal by a receiver. Interference to resources allocated for reference signals, e.g., demodulation reference signal (DMRS), may be minimized. Power ratio control may reduce interference coming from eMBB resources. In some circumstances (e.g., severe communication channel conditions), even minimal interference to reference signals may cause degradation to channel estimation performance and (e.g., hence) detection performance. Complete avoidance of interference to reference signal resources may improve the process of channel estimation. The amount of interference from an eMBB signal relative to reference signal resources of an URLLC signal may be managed, reduced, and/or suppressed.

URLLC and eMBB may have the same numerology.

Figure 3:
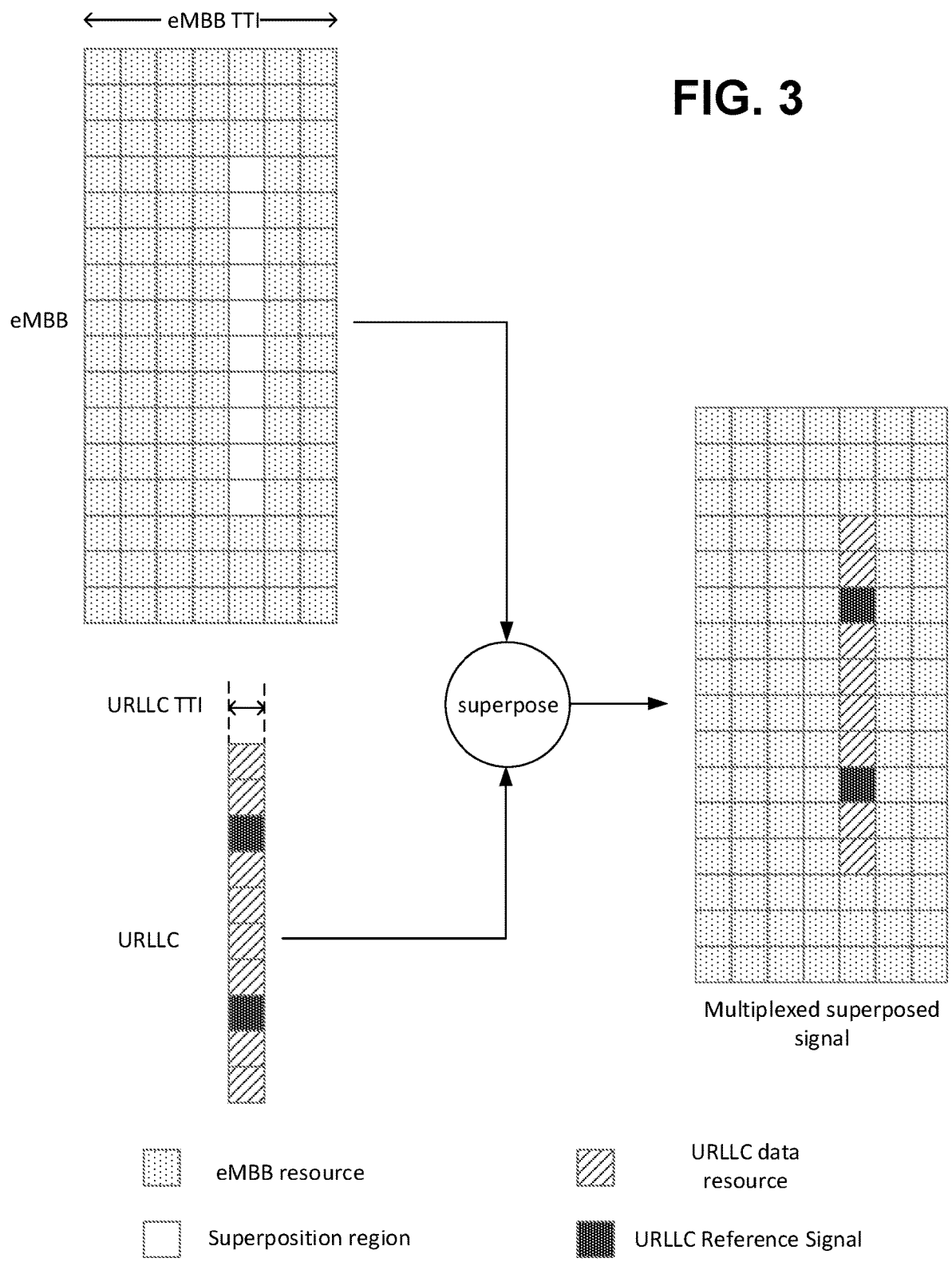
FIG. 3 is an example of superposition of URLLC and eMBB signals with the same numerology.

FIG. 3 is an example of superposition of URLLC and eMBB signals with the same numerology. URLLC and eMBB resources (e.g., URLLC and eMBB time-frequency resources) may overlap on top of each other (e.g., one-to-one). In examples, a bandwidth of an URLLC signal may be smaller than a bandwidth of an eMBB signal. In examples, a bandwidth of an URLLC signal may be greater than or equal to a bandwidth of an eMBB signal. An eMBB signal may (e.g., also) be a composite signal that may target multiple eMBB WTRUs. A composite signal may be constructed, for example, by an arbitrary multiple access scheme. One or more (e.g., each of the) eMBB resources may cause interference to one or more URLLC resources that may exist on the same time-frequency unit. In an example, eMBB resources may be assigned less power compared to URLLC resources. For example, eMBB resources may be assigned less power compared to URLLC resources to reduce the effect of interference.

URLLC reference signal (RS) interference may be mitigated (e.g., avoided) for URLLC and eMBB signals with the same numerology.

Figure 4:
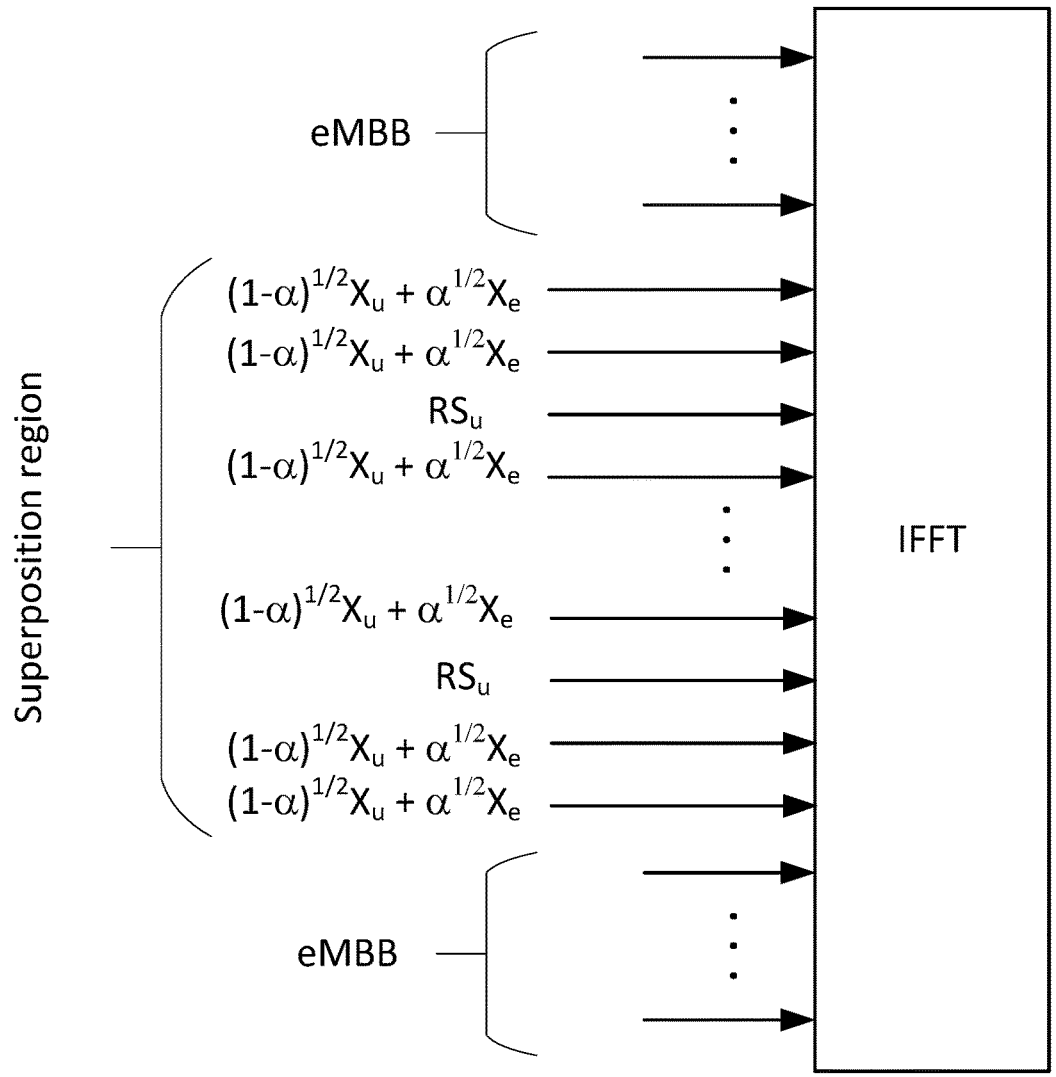
FIG. 4 is an example of eMBB and URLLC resources multiplexed and superposed with different power ratios.

FIG. 4 is an example of eMBB and URLLC resources multiplexed and superposed with different power ratios. FIG. 4 shows an (e.g., first) example of superpositioning eMBB data and reference symbols with URLLC data and reference symbols, which may be referenced as Scheme 1. In an example, a power ratio of an eMBB signal may be a (a≤0.5, a≠0), for example, on resources where superposition occurs and URLLC carries a data resource. A power ratio may be defined, for example, as a ratio of an eMBB resource power to the total power of the transmit resource. A power ratio of an URLLC resource may be 1−a. In an example, a power ratio of eMBB resources that may overlap with URLLC reference resources may be set to 0 (a=0), while an URLLC power ratio for reference symbols may be set to 1. In an example, a power ratio setting a of an eMBB signal (and counterpart power ratio setting 1−a of an URLLC resource) may follow a rule, for example, such as the rule shown in Eq. 1:

$$\alpha = \begin{cases} 1 & \text{non-superposition resources: } eMBB \text{ resources,} \\ & \text{e.g., } eMBB \text{ superposition resources} \\ \leq 0.5 & \text{superposition resource: } URLLC \\ & \text{data resource} \\ 0 & \text{superposition resource:} \\ & URLLC \text{ reference signal resource} \end{cases} \quad \text{Eq. 1}$$

URLLC transmission may overlap eMBB reference symbols. Interference may affect the accuracy of eMBB channel estimation. The number of eMBB DMRS reference symbols may be small. For example, the number of eMBB DMRS reference symbols may be smaller (e.g., much smaller) than the number of eMBB data symbols. Restricting an URLLC transmission to avoid overlapping eMBB reference symbols may impose a negligible constraint on the resource selection for an URLLC transmission. A gNB may achieve this, for example, by not assigning any URLLC signal to a subcarrier that may be (e.g., is) allocated to eMBB DMRS signals. An URLLC transmission may not transmit (e.g., avoid occupying) resources allocated for other reference signals (e.g., channel state information RS (CSI-RS)) or control signals (e.g., physical downlink control channel (PDCCH) and/or enhanced PDCCH (ePDCCH)).

URLLC reference signal (RS) interference may be mitigated (e.g., avoided) for URLLC and eMBB signals with the same numerology based on sub-frame/slot/mini-slot misalignment.

In examples, a sub-frame/slot/mini-slot structure of an eMBB transmission and an URLLC transmission may not be aligned. For example, an RS for eMBB WTRU may be at a different point relative to an RS for URLLC WTRU.

One or more of the following may be used for URLLC RS interference avoidance: channel estimation performance of an URLLC transmission may be protected by zeroing out an eMBB transmission; and/or channel estimation performance of an URLLC transmission may be protected by a dual scheme.

In examples, channel estimation performance of an URLLC transmission may be protected, for example, by zeroing out an eMBB transmission. For example, a power ratio setting a of an eMBB signal may follow a rule, such as the rule shown in Eq. 1 to zero out an eMBB transmission for an URLLC transmission (e.g., URLLC reference signal resource).

In examples, channel estimation performance of an URLLC transmission may be protected, for example, by a dual scheme. For example, channel estimation performance of both an URLLC transmission and an eMBB transmission may be protected. Interference on RS signals (e.g., for eMBB and/or URLLC transmissions) may be set to zero. An example may be shown in FIG. 5.

Figure 5:
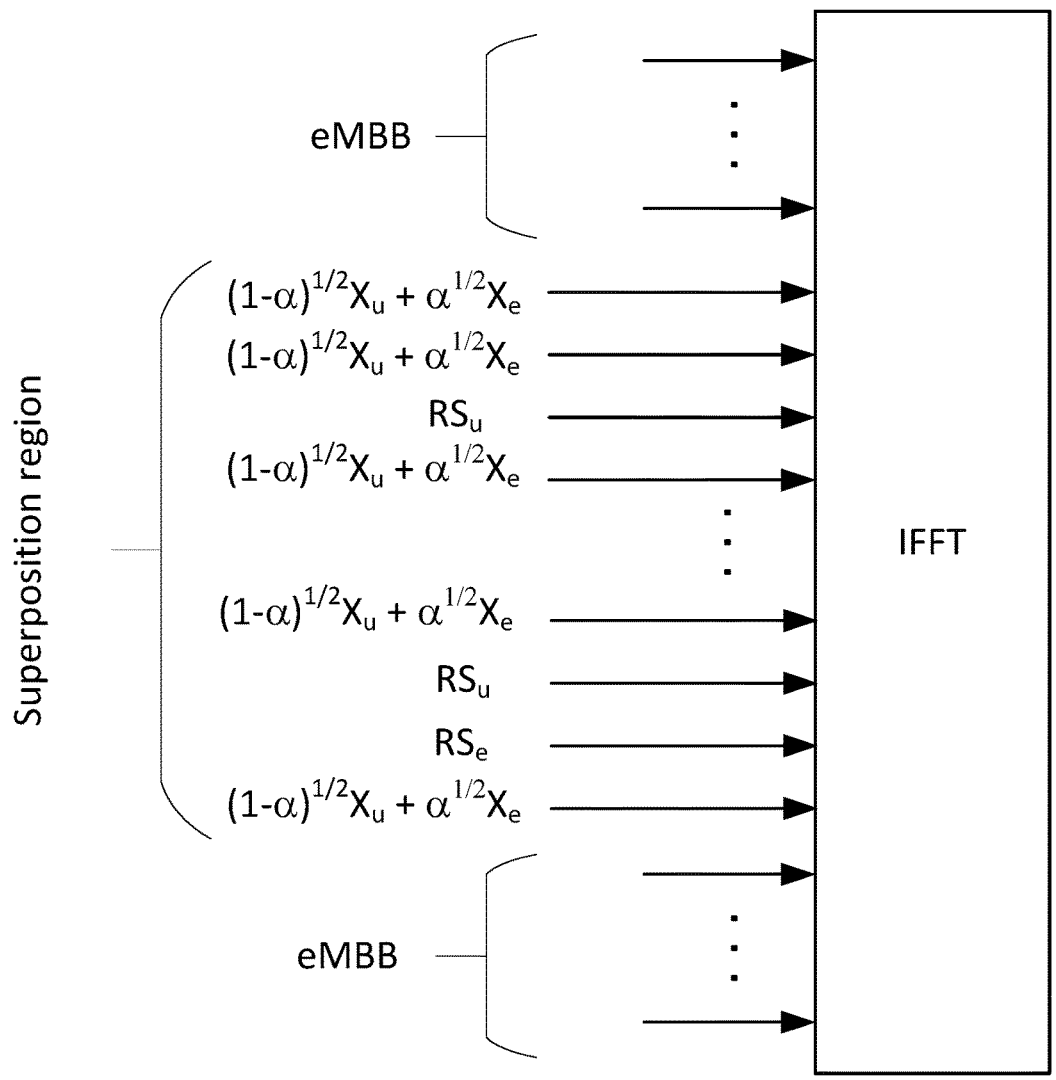
FIG. 5 is an example of superposition of eMBB data and reference symbols with URLLC data and reference symbols.

FIG. 5 is an example of superposition of eMBB data and reference symbols with URLLC data and reference symbols, which may be referred to as Scheme 2.

eMBB transmission power may be set to zero for URLLC RS signals. For example, eMBB transmission power may be set to zero by puncturing eMBB data. The eMBB transmission power set to zero may imply the puncturing of eMBB data. The impact on performance may be high, for example, when an encoder/rate matching algorithm may not be aware of this prior to operation. An indicator may ensure that an eMBB decoder is made aware of this, for example, to remove the effect of puncturing before decoding (e.g., by setting a log likelihood ratio (LLR) to 0 or the probability of correct decoding to ½).

URLLC data may not transmit (e.g., avoid) one or more (e.g., all) resources for eMBB RS signals. An URLLC transmitter may be aware of the location of eMBB RS signals (e.g., prior to encoding the URLLC transmission). As such, the impact on URLLC transmission performance may be lower than an impact on eMBB transmission, for example, given that the encoder/rate matching procedure may know or may be configured for the actual number of resources.

In an example, a power ratio setting a of an eMBB signal (and counterpart power ratio setting 1−a of an URLLC resource) may follow a rule, for example, such as the rule shown in Eq. 2:

$$\alpha = \begin{cases} 1 & \text{non-superposition resources: } eMBB \text{ resources,} \\ & \text{e.g., } eMBB \text{ only resource} \\ \leq 0.5 & \text{superposition resources: } URLLC \text{ data resource} \\ 0 & \text{superpostion resource:} \\ & URLLC \text{ reference signal resource} \\ 1 & \text{superposition resources: all or some} \\ & eMBB \text{ reference signal resources} \end{cases} \quad \text{Eq. 2}$$

Examples provided herein (e.g., scheme 1 and scheme 2) and other examples may be implemented for DL and/or UL transmissions.

URLLC RS interference may be mitigated (e.g., avoided) for URLLC and eMBB signals with the same numerology based on sub-frame/slot/mini-slot alignment.

In examples, a sub-frame/slot/mini-slot structure of an eMBB transmission and an URLLC transmission may be aligned. For example, an RS for eMBB WTRU and RS for URLLC WTRU may be located at the same positions.

In examples, there may be a DMRS for each WTRU with a precoder/pre-coding matrix indicator (PMI) P1 for eMBB transmission and precoder/PMI P2 for URLLC transmission. An URLLC WTRU and eMBB WTRU may have one or more of the following: having the same PMI/beam in downlink URLLC transmission; having different PMI/beam in downlink URLLC transmission although DMRS may be used; and/or having different PMI/beam in downlink URLLC transmission.

Figure 6:
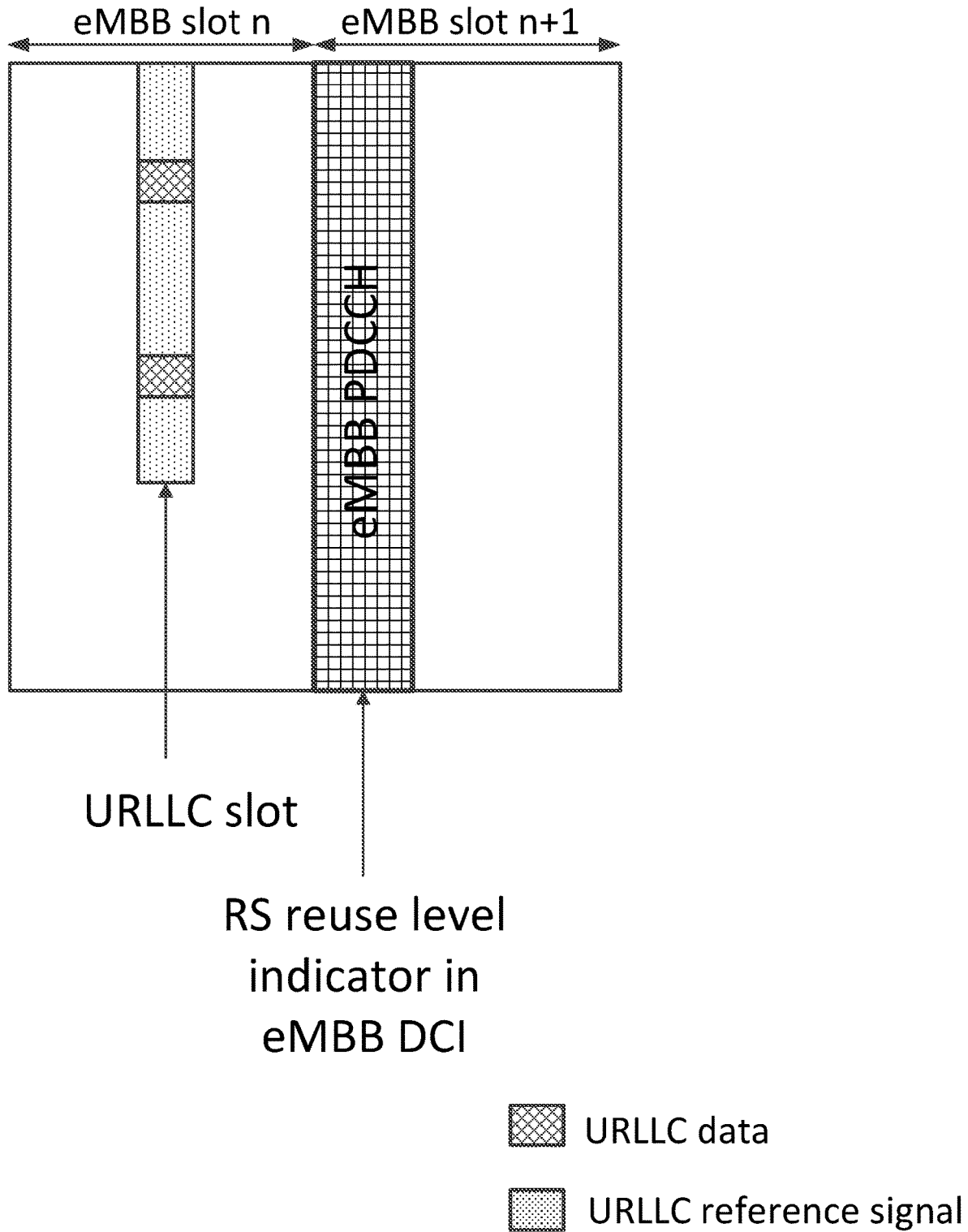
FIG. 6 is an example of RS reuse indicator in eMBB transmission.

In examples, an URLLC WTRU and an eMBB WTRU may have the same PMI/beam in downlink URLLC transmission (e.g., P1=P2=P) and may be referred to as Scenario 1. A gNB may not change a reference symbol and may use a precoded DMRS (e.g., with the precoder set to P). An indication may be sent to inform the WTRUs that they may perform channel estimation (e.g., normal channel estimation). For example, the reference symbols may be incorporated in the preempted region in the channel estimation procedure (e.g., normal channel estimation). In examples, the indication may be sent in the current slot. In examples, the indication may be sent in the PDCCH of the next slot. For example, FIG. 6 illustrates an example RS reuse indicator in eMBB downlink control information (DCI). The eMBB PDCCH may be located within the eMBB transmission. For example, the eMBB PDCCH may be located at the beginning of the slot in the eMBB transmission as shown in FIG. 6. In examples and as shown in FIG. 6, the eMBB transmission may be received in a first slot (e.g., eMBB slot n) and the indication may be received in a second slot (e.g., eMBB slot n+1). The second slot may be a next slot after the first slot, as shown in FIG. 6. A scheduler restriction on URLLC WTRUs may be implied and may be scheduled (e.g., scheduled simultaneously) with an eMBB WTRU.

The DMRS may have large scale and/or some small scale properties in common (e.g., where P1≈P2). An indication may be sent by the gNB (e.g., in DL transmission) or by the WTRU (e.g., in UL transmission). For example, the indication, sent by the gNB or by the WTRU, may indicate specific channel parameters that have properties (e.g., similar properties) for both the non-preempted and preempted RS. The preempted RS may be used for path loss estimation, average delay spread, Doppler Spread, and/or average path loss estimation or channel gain. The preempted RS may be used for actual channel estimation. The beams may be termed similar beams. Similar beams may be signaled to the WTRU or may be decided (e.g., autonomously decided).

A network entity may send an indication. In examples, a network entity (e.g., gNB) may send an indication (e.g., associated with a downlink transmission). In examples, a network entity (e.g., gNB) may send an indication in a downlink control information (DCI). The indication may include a preemption indication and a RS reuse indication. In examples, the pre-emption indication (e.g., for downlink transmission) may include a parameter that indicates the beam channel estimation similarity (e.g., RS reuse indication). In examples, the preemption indication may indicate that an URLLC transmission preempts a portion of the eMBB transmission. The RS reuse indication may indicate whether a RS in the preempted portion of the eMBB transmission can be reused. For example, the RS reuse indication may include a level of reuse of the RS in the preempted portion of the eMBB that can be reused. The level of reuse of the RS may include one or more of the following levels: level 0, level 1, level 2, and/or level 3. For example, level 0 may indicate that there is no or substantially no similarity and the WTRU may not use the RS for any channel estimation functions; level 1 may be used for long term channel property estimation (e.g., path loss); level 2 may be used for level 1 estimation functions (e.g., path loss channel estimation) and/or timing/Doppler shift estimation; and level 3 may be used for full channel estimation (e.g., full channel estimation in which the estimate of the channel from the RS may be used for data demodulation).

If the RS reuse indication indicates that the RS in the preempted portion of the eMBB transmission can be reused (e.g., based on the indication), channel estimation function set may be determined. Channel estimation may be performed using the determined channel estimation function set. In examples, if the RS reuse indication indicates that the RS in the preempted portion of the eMBB transmission can be reused, a channel estimation function set associated with a level of reuse indicated by the RS reuse indication (e.g., level 1-3) may be determined. In examples, if the RS reuse indication indicates that the RS in the preempted portion of the eMBB transmission cannot be reused, the RS for the channel estimation may be ignored (e.g., skipped).

The eMBB transmission and the URLLC transmission may be decoded (e.g., based on the performed channel estimation).

Figure 7:
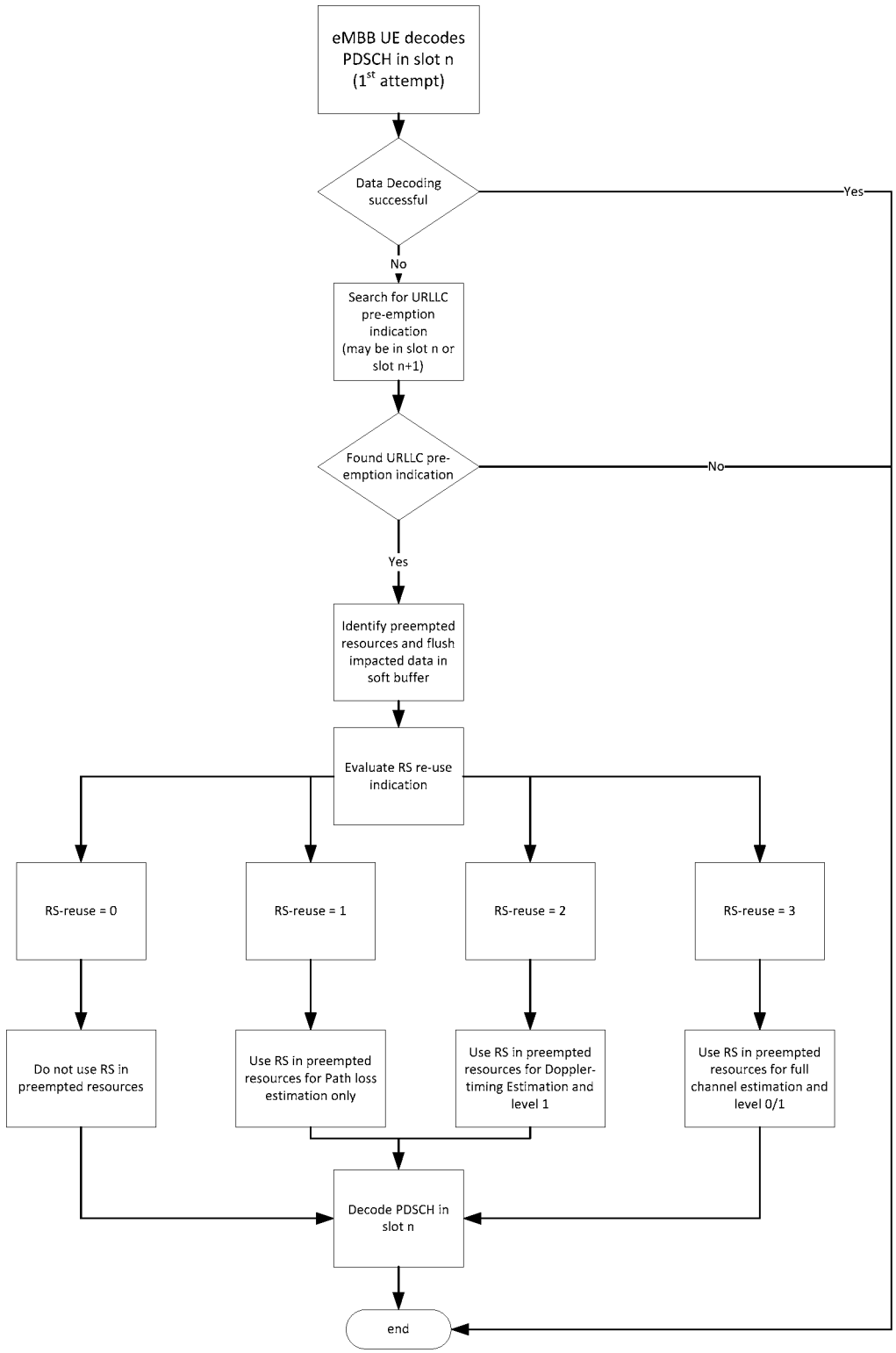
FIG. 7 is an associated with an RS reuse indication.

FIG. 7 is an example associated with an RS reuse indication. A WTRU (e.g., eMBB WTRU) may be configured to decode a DL transmission (e.g., eMBB transmission). A WTRU may receive an eMBB transmission. For example, the WTRU may receive an eMBB transmission in a first slot. The WTRU may decode the eMBB transmission (e.g., PDCCH within the eMBB transmission) and may identify resources with assigned data. The WTRU may decode data. If the WTRU successfully decodes data, the WTRU may skip searching for an indication associated with the eMBB transmission. For example, the WTRU may perform channel estimation by incorporating the reference symbols in the preempted region (e.g., normal channel estimation). The WTRU may infer that the RS resources are not preempted.

If data decoding fails (e.g., RS resources may be preempted), a WTRU may search for an indication associated with the eMBB transmission. The WTRU may receive the indication in a second slot. For example, the second slot may be a next slot after the first slot (e.g., the eMBB transmission may have been received in the first slot). The indication may include a preemption indication and/or a RS reuse indication. The WTRU may identify resources assigned to an URLLC WTRU based on the indication. For example, the WTRU may identify RS resources that may be pre-empted based on the indication (e.g., preemption indication and/or RS reuse indication). The preemption indication may indicate that an URLLC transmission preempts a portion of the eMBB transmission.

The RS reuse indication may indicate whether the RS in the preempted portion of the eMBB transmission can be reused (e.g., whether the RS in the preempted portion of the eMBB transmission can be used to some extent for channel estimation associated with the eMBB data demodulation). If the RS reuse indication indicates that the RS in the pre-empted portion of the eMBB transmission can be reused, the WTRU may determine a channel estimation function set associated with a level of reuse indicated by the RS reuse indication. The RS reuse indication associated with the reusability of the RS in the preemption portion of the eMBB transmission may be associated with the level of reuse (e.g., level 1-3 shown in FIG. 7). If the RS reuse indication indicates that the RS in the preempted portion of the eMBB transmission cannot be reused, the WTRU may determine to ignore (e.g., skip) the RS in the preempted resource. The RS reuse indication associated with the non-reusability of the RS in the preemption portion of the eMBB transmission may be associated with the level 0 of reuse shown in FIG. 7.

The WTRU may perform a channel estimation. For example, the WTRU may perform channel estimation based on the determined channel estimation function set associated with the level of reuse (e.g., level 0-3 shown in FIG. 7). The WTRU may use the RS resource based on the beam channel estimation similarity in the pre-emption indication. For example, if RS resources are preempted, the WTRU may use the RS resource based on the beam channel estimation similarity based on the indication (e.g., RS reuse indication). The eMBB may decode preempted data as described herein.

Figure 8:
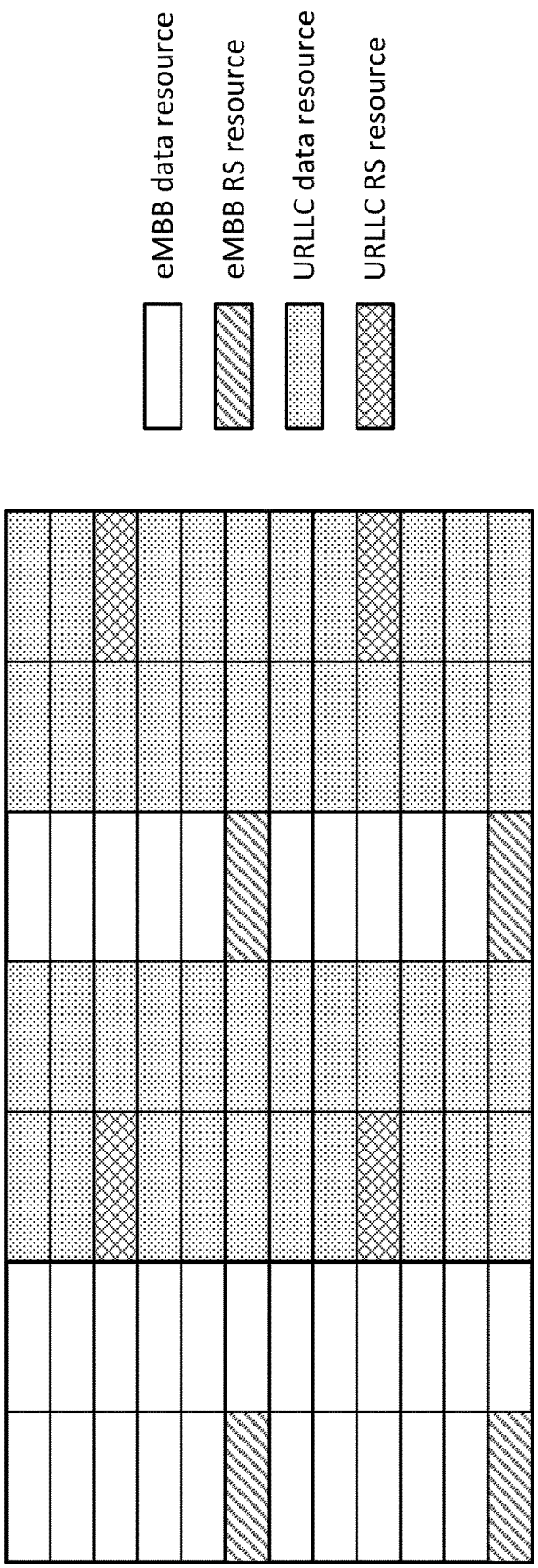
FIG. 8 is an example of an URLLC resource restriction to ensure minimum eMBB WTRU channel estimation performance.

In examples, an URLLC WTRU and an eMBB WTRU may have different PMI/beam in downlink URLLC transmission (e.g., P1≠P2) although DMRS may be used and may be referred to as Scenario 2. In an example, an eMBB RS may be zeroed out (e.g., in accordance with a rule such as Eq. 1). For example, an eMBB RS may be zeroed out by puncturing. An indication may be sent to inform an eMBB WTRU that it may (e.g., should) adjust its channel estimation procedure. For example, an indication may be sent to inform an eMBB WTRU that it may adjust its channel estimation procedure to discount the punctured RS. In examples, a time-frequency interpolation may be performed, for example, using other RSs. For example, a time-frequency interpolation may be performed using other RSs to mitigate (e.g., avoid) increasing the number of errors. In examples, URLLC resources that are scheduled may be restricted. For example, URLLC resources that are scheduled may be restricted to ensure a minimum performance for eMBB WTRU channel estimation. FIG. 8 illustrates an example of an URLLC resource restriction. URLLC preemption may not be permitted for symbols that include an eMMB RS resource. For example, an URLLC resource may be restricted to ensure minimum eMBB WTRU channel estimation performance.

In examples, an URLLC WTRU and an eMBB WTRU may have different PMI/beam in downlink URLLC transmission (e.g., P1≠P2) and may be referred to as Scenario 3. In examples, a non-precoded DMRS may be transmitted with P1=P2=I. Both WTRUs may be able to estimate the actual channel at the RS. One or more of the following may apply: a PMI may be transmitted with the downlink indication for an URLLC WTRU; an open loop transmission scheme or semi-open loop transmission scheme may be used for an URLLC WTRU and/or an eMBB WTRU; and/or an indicator channel may signal the non-precoded RS resources and/or the PMI index to an eMBB WTRU.

In examples for the URLLC WTRU, a PMI may be transmitted with the downlink indication to enable the receiver to estimate the actual channel by combining the PMI and the estimated channel (e.g., H_eff=PMI_2*H_est).

In examples for the URLLC WTRU and/or the eMBB WTRU, an open loop transmission scheme (e.g., space frequency block coding (SFBC) or space time block coding (STBC)) or semi-open loop transmission scheme (e.g., pre-determined precoder cycling) may be used, which may skip estimating the precoded channel.

In examples for the eMBB WTRU, an indicator channel may signal the non-precoded RS resources and/or the PMI index to the WTRU. The eMBB receiver may combine the estimated channel (e.g., with the signaled PMI index, if available) with DMRS based channel estimates to estimate the overall channel.

Figure 9:
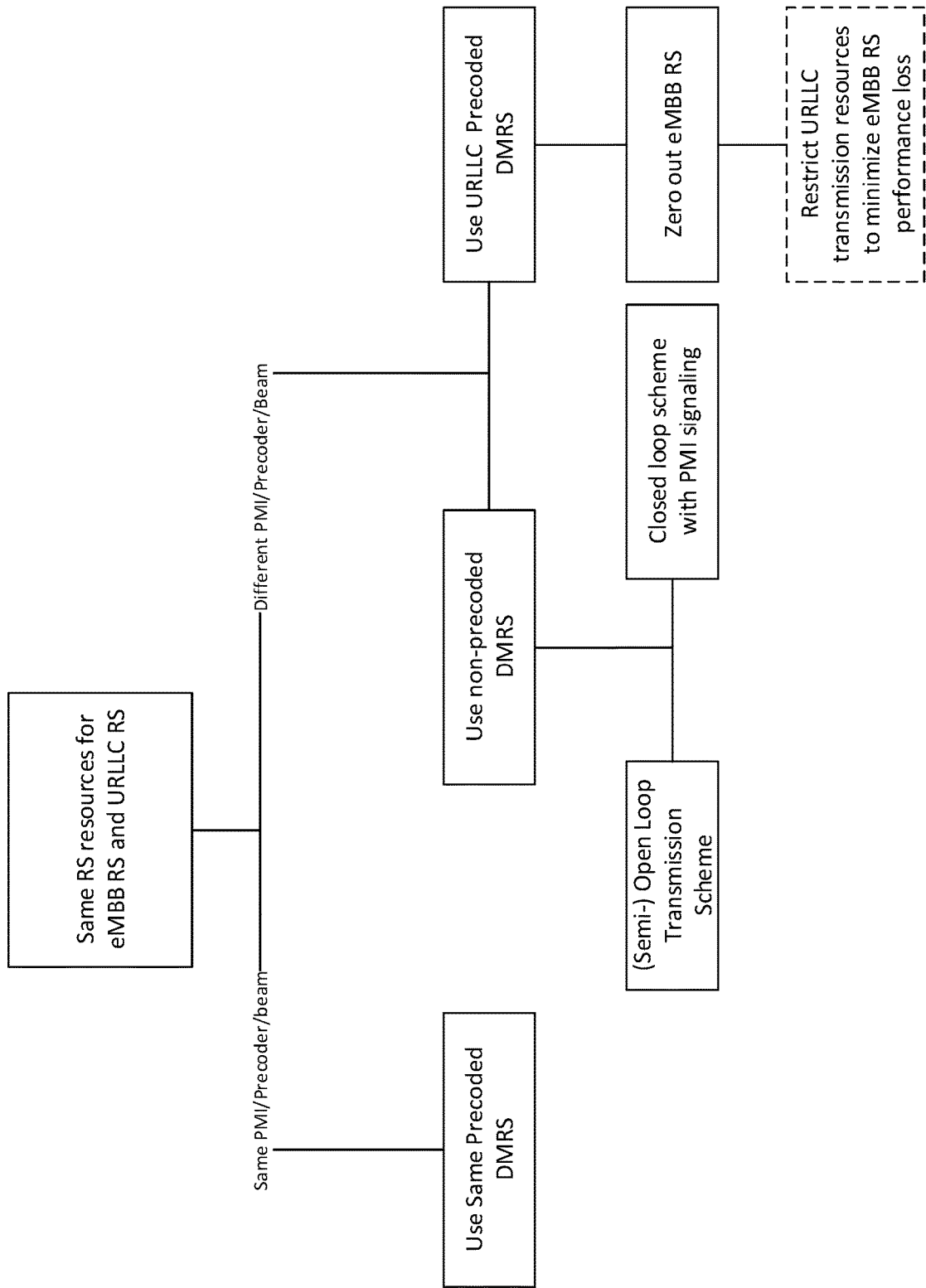
FIG. 9 is an example of an eMBB and URLLC RS alignment.

FIG. 9 is an example for eMBB and URLLC RS alignment as described herein. For example, URLLC RS interference may be mitigated (e.g., avoided) for URLLC and eMBB signals with the same numerology based on sub-frame/slot/mini-slot alignment. In examples, a sub-frame/slot/mini-slot structure of an eMBB transmission and an URLLC transmission may be aligned. For example, an RS for eMBB WTRU and RS for URLLC WTRU may be located at the same positions.

In examples, there may be a DMRS for each WTRU with a precoder/pre-coding matrix indicator (PMI) P1 for eMBB transmission and precoder/PMI P2 for URLLC transmission. An URLLC WTRU and eMBB WTRU may have one or more of the following: having the same PMI/beam in downlink URLLC transmission; having different PMI/beam in downlink URLLC transmission although DMRS may be used; and/or having different PMI/beam in downlink URLLC transmission.

In examples, an URLLC WTRU and an eMBB WTRU may have the same PMI/beam in downlink URLLC transmission (e.g., P1=P2=P) and may be referred to as Scenario 1. A gNB may not change a reference symbol and may use a precoded DMRS (e.g., with the precoder set to P) as shown in FIG. 9. An indication may be sent to inform the WTRUs that they may perform channel estimation (e.g., normal channel estimation). For example, the reference symbols may be incorporated in the preempted region in the channel estimation procedure (e.g., normal channel estimation). In examples, the indication may be sent in the current slot. In examples, the indication may be sent in the PDCCH of the next slot. A scheduler restriction on URLLC WTRUs may be implied and may be scheduled (e.g., scheduled simultaneously) with an eMBB WTRU.

In examples, an URLLC WTRU and an eMBB WTRU may have different PMI/beam in downlink URLLC transmission (e.g., P1≠P2) although DMRS may be used and may be referred to as Scenario 2. In an example, an eMBB RS may be zeroed out (e.g., in accordance with a rule such as Eq. 1). For example, an eMBB RS may be zeroed out by puncturing. An indication may be sent to inform an eMBB WTRU that it may (e.g., should) adjust its channel estimation procedure. For example, an indication may be sent to inform an eMBB WTRU that it may adjust its channel estimation procedure to discount the punctured RS. In examples, a time-frequency interpolation may be performed, for example, using other RSs. For example, a time-frequency interpolation may be performed using other RSs to mitigate (e.g., avoid) increasing the number of errors. In examples, URLLC resources that are scheduled may be restricted. For example, URLLC resources that are scheduled may be restricted to ensure a minimum performance for eMBB WTRU channel estimation. FIG. 8 illustrates an example of an URLLC resource restriction. URLLC preemption may not be permitted for symbols that include an eMMB RS resource. For example, an URLLC resource may be restricted to ensure minimum eMBB WTRU channel estimation performance.

In examples, an URLLC WTRU and an eMBB WTRU may have different PMI/beam in downlink URLLC transmission (e.g., P1≠P2) and may be referred to as Scenario 3. In examples, a non-precoded DMRS may be transmitted with P1=P2=I. Both WTRUs may be able to estimate the actual channel at the RS. One or more of the following may apply: a PMI may be transmitted with the downlink indication for an URLLC WTRU; an open loop transmission scheme or semi-open loop transmission scheme may be used for an URLLC WTRU and/or an eMBB WTRU; and/or an indicator channel may signal the non-precoded RS resources and/or the PMI index to an eMBB WTRU.

In examples for the URLLC WTRU, a PMI may be transmitted with the downlink indication to enable the receiver to estimate the actual channel by combining the PMI and the estimated channel (e.g., H_eff=PMI_2*H_est).

In examples for the URLLC WTRU and/or the eMBB WTRU, an open loop transmission scheme (e.g., SFBC) or semi-open loop transmission scheme (e.g., pre-determined precoder cycling) may be used, which may skip estimating the precoded channel.

In examples for the eMBB WTRU, an indicator channel may signal the non-precoded RS resources and/or the PMI index to the WTRU. The eMBB receiver may combine the estimated channel (e.g., with the signaled PMI index, if available) with DMRS based channel estimates to estimate the overall channel.

Figure 10:
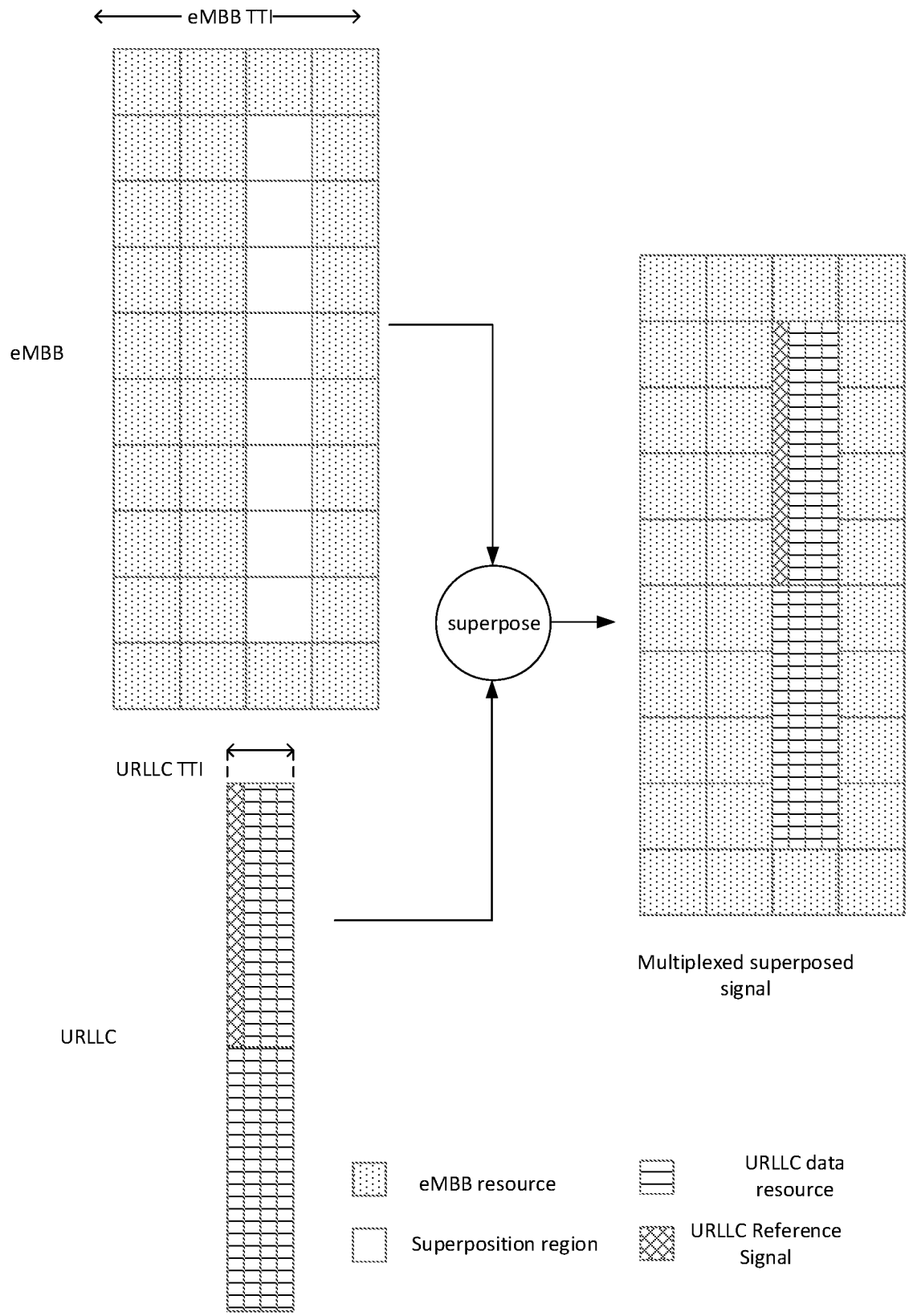
FIG. 10 is an example of a superposition of URLLC and eMBB signals with different numerologies.

FIG. 10 is an example of a superposition of URLLC and eMBB signals with different numerologies. In an example, subcarrier spacing of an URLLC signal may be four (4) times as subcarrier spacing of an eMBB signal. An URLLC OFDM symbol duration may be selected to be ¼ duration of an eMBB OFDM symbol. In this example, a symbol boundary of one eMBB OFDM symbol may align with four (4) URLLC OFDM symbols. In examples, the bandwidth of an URLLC signal may be smaller than the bandwidth of an eMBB signal. In examples, the bandwidth of an URLLC signal may be greater than or equal to the bandwidth of an eMBB signal. An eMBB signal may (e.g., also) be a composite signal targeting multiple eMBB WTRUs, which may be constructed by an arbitrary multiple access scheme. An (e.g., each) eMBB resource may cause interference to multiple URLLC resources. With different numerologies (e.g., superposition of URLLC and eMBB signals with different numerologies), URLLC resources may be affected by eMBB resources (e.g., it may not be straightforward to see what URLLC resources may be affected by which eMBB resources). A system analysis described herein may determine a mathematical model that calculates the amount of interference leakage from a given eMBB resource to one or more (e.g., all) other URLLC resources when eMBB and URLLC signals are being superposed on top of each other with different numerology.

eMBB and URLLC signals may be multiplexed using superposition.

Figure 11:
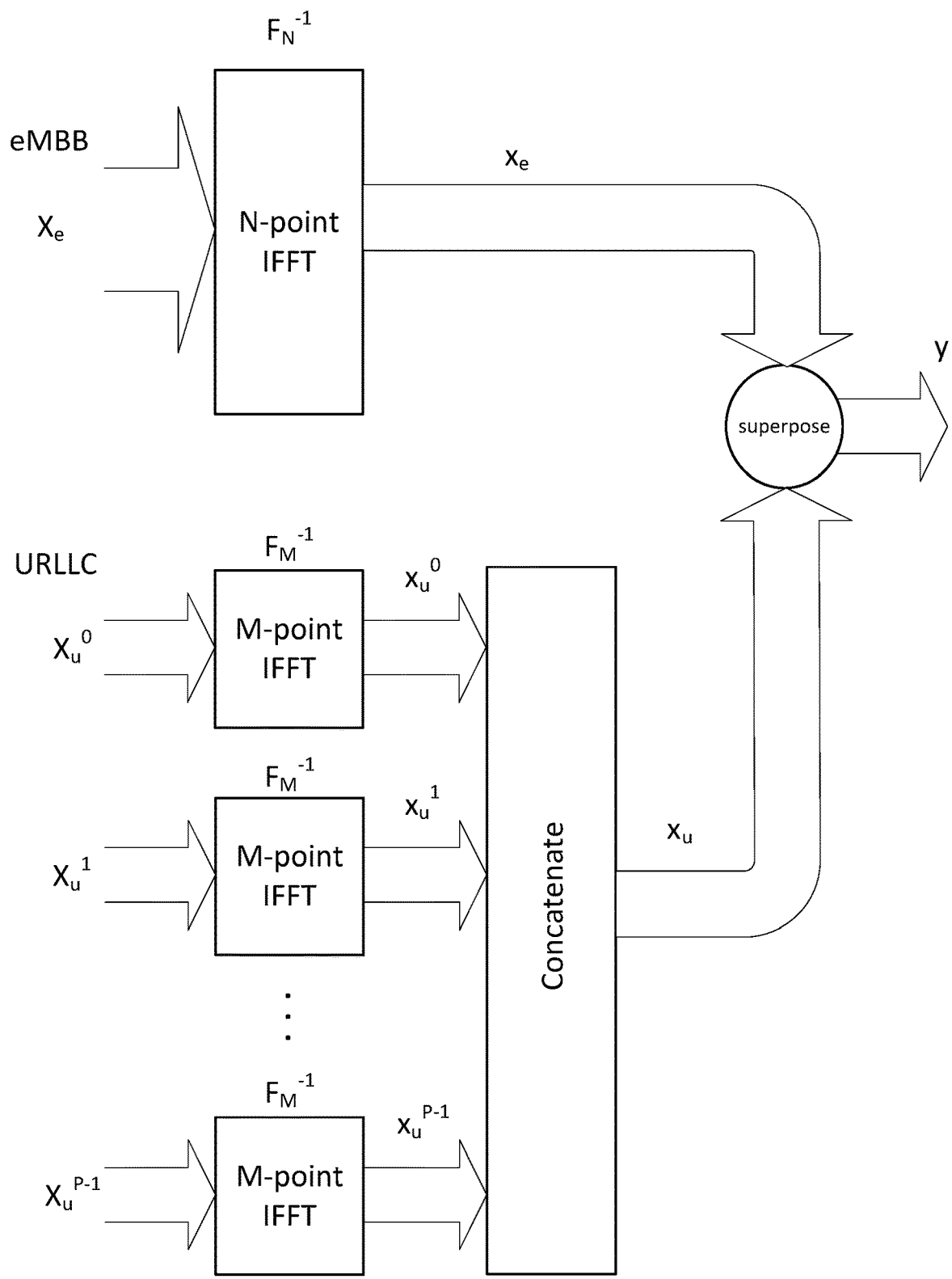
FIG. 11 is an example of a superposition operation, e.g., in a gNB transmission.

FIG. 11 is an example of a superposition operation, e.g., in a gNB transmission. In examples, eMBB and URLLC OFDM symbols may have N and M subcarriers, respectively, in a superposition region. For example, P URLLC OFDM symbols may exist in one eMBB OFDM symbol (e.g., M=N/P).

In examples (e.g., as shown in FIG. 11 for simplicity), inverse FFT operations of sizes M and N may be shown by inverse direct Fourier transform (DFT) matrices of $F_M^{-1}$ and $F_N^{-1}$. An eMBB OFDM symbol $x_e$ may be generated by an N-point IFFT operation on $X_e$. P URLLC OFDM symbols $x_u^0, x_u^1, \ldots, x_u^{P-1}$ may be generated by P M-point IFFT operations. URLLC OFDM symbols may be concatenated in the time domain. For example, URLLC OFDM symbols may be concatenated in the time domain to produce an N-point sequence $x_u$. Output time domain signal y may be generated, for example, by adding $x_e$ and $x_u$. In an example, output signal y may be defined in accordance with Eq. 3:

$$y = \begin{bmatrix} F_M^{-1} X_u^0 \\ --- \\ F_M^{-1} X_u^1 \\ --- \\ \vdots \\ --- \\ F_M^{-1} X_u^{P-1} \end{bmatrix} + \begin{bmatrix} (F_N^{-1})^0 X_e \\ --- \\ (F_N^{-1})^1 X_e \\ --- \\ \vdots \\ --- \\ (F_N^{-1})^{P-1} X_e \end{bmatrix} \quad \text{Eq. 3}$$

where $(F_N^{-1})^p$, p=0, 1, ..., P−1, may be an M×N matrix that may comprise rows pM+1 to (p+1)M of inverse DFT matrix $F_N^{-1}$.

Figure 12:
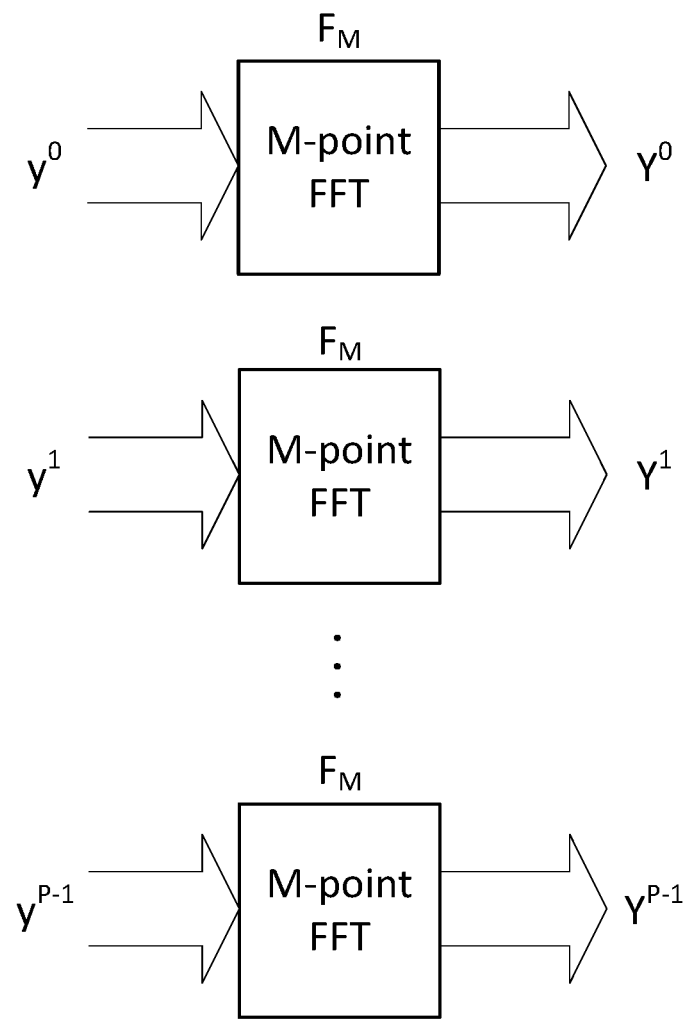
FIG. 12 is an example of an URLLC receiver.

FIG. 12 is an example of an URLLC receiver. FIG. 12 shows an example of M-point FFT operations at an URLLC receiver. An URLLC receiver may, for example, perform an M-point FFT operation on P sequences of length M that may be received during an URLLC transmission time interval (TTI). Received vectors $y^p$, p=0, ..., P−1, may be specified as N×1 vectors in accordance with Eq. 4:

$$y = \begin{bmatrix} y^0 \\ --- \\ y^1 \\ --- \\ \vdots \\ --- \\ y^{P-1} \end{bmatrix} \quad \text{Eq. 4}$$

where y may be defined, for example, in accordance with Eq. 3. Eq. 3 and Eq. 4 may yield Eq. 5:

$$\begin{aligned} Y^p &= F_M \cdot y^p \\ &= X_u^p + F_M (F_N^{-1})^p X_e \\ &= X_u^p + G^p X_e, \end{aligned} \quad \text{Eq. 5}$$

-continued $$p = 0, 1, \ldots, P-1$$

where $G^p$ may be defined, for example, in accordance with Eq. 6:

$$G^p = F_M (F_N^{-1})^p \quad \text{Eq. 6}$$

The term $X_u^p$ may be a desired signal and the term $G^p X_e$ may be interference from eMBB resources. Elements of M×N matrix $G^p$ may determine the amount of interference from eMBB resources to URLLC resources. The m-th row of $G^p$ may determine an amount of interference to resource m of the p-th URLLC symbol. Similarly, the n-th element of the m-th row of $G^p$ may determine an amount of interference from an n-th eMBB resource. Interference matrix $G^p$ may be a product of a DFT matrix with size M by a partition of inverse DFT matrix with size N. Rows of the interference matrix may have Sinc function properties. The interference leakage to an URLLC resource may follow a Sinc function pattern and may come from multiple eMBB resources.

URLLC RS interference may be mitigated (e.g., avoided) for different numerologies.

Interference leakage from eMBB resources to URLLC resources may be shown, e.g., by example. In an example, N, M, and M may be configured to: N=32, P=4, and M=8. For example, the number of eMBB resources in an OFDM symbol (or subcarriers) may be 32. The subcarrier spacing of URLLC may be 4 times subcarrier spacing of eMBB. 8 URLLC subcarriers may exist in the same bandwidth of eMBB. 4 URLLC OFDM symbols may exist within one eMBB OFDM symbol in time.

Figure 13:
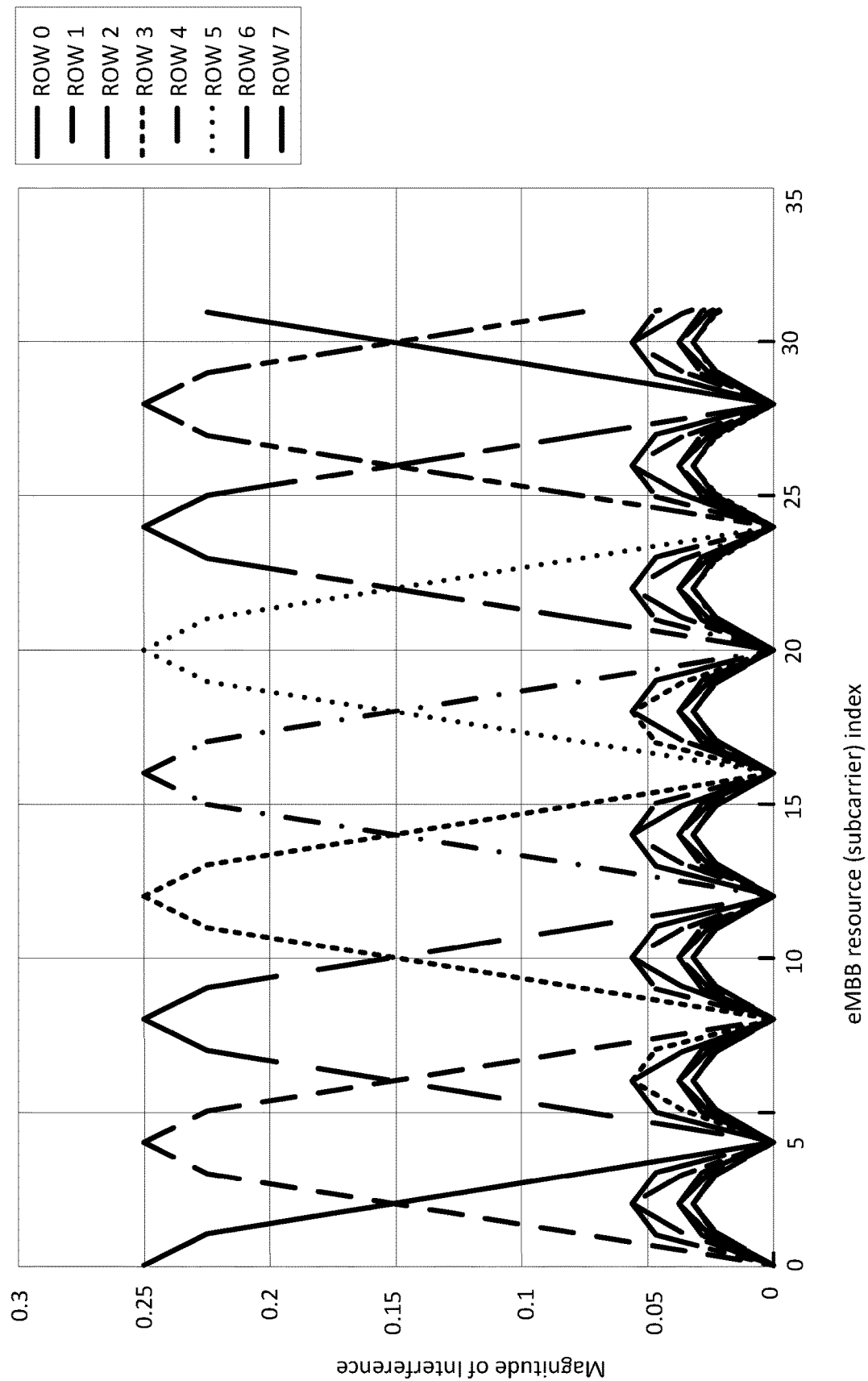
FIG. 13 is an example magnitude plot of rows of interference matrix $G^p$.

FIG. 13 is an example magnitude plot of rows of interference matrix $G^p$. FIG. 13 shows a plot of one or more (e.g., all) 8 rows of interference matrix $G^p$. Row i (i=0, ..., 7) may correspond to resource (e.g., subcarrier) i in URLLC resources. The plot of row i may show the strength of interference from corresponding resources (e.g., subcarriers) of eMBB in a horizontal axis. For example, row 3 shown in FIG. 13 may show the interference to the URLLC resource 3 may come (e.g., come mostly) from eMBB resources 11, 12, and 13.

In an example, an URLLC/eMBB composite signal may be multiplexed using superposition. A superposition region eMBB may have N resources in one OFDM symbol and an URLLC may have M resources in NIM OFDM symbols. Interference to an URLLC reference signal at resource m (m=0, ..., M−1) of symbol p (p=0, ..., P−1) may be mitigated (e.g., avoided), for example, by setting resources in locations [(P·m−1) mod N], [(P·m) mod N], and [(P·m+1) mod N] to zero in eMBB resources.

Features, elements and actions (e.g., processes and instrumentalities) are described by way of non-limiting examples. While examples may be directed to LTE, LTE-A, New Radio (NR) or 5G protocols, subject matter herein is applicable to other wireless communications, systems, services and protocols. Each feature, element, action or other aspect of the described subject matter, whether presented in figures or description, may be implemented alone or in any combination, including with other subject matter, whether known or unknown, in any order, regardless of examples presented herein.

Systems, methods and instrumentalities have been disclosed for interference reduction for reference symbols in URLLC/eMBB multiplexing. URLLC and/or eMBB reference signal interference may be reduced regardless whether URLLC and eMBB reference signals and data are multiplexed and superimposed using the same numerology or different numerologies and/or regardless whether URLLC and eMBB reference signals may be aligned or misaligned (e.g., may or may not use a common resource).

A WTRU may refer to an identity of the physical device, or to the user's identity such as subscription related identities, e.g., mobile station international subscriber directory number (MSISDN), session initiation protocol (SIP) uniform resource identifier (URI), etc. WTRU may refer to application-based identities, e.g., user names that may be used per application.

Each of the computing systems described herein may have one or more computer processors having memory that are configured with executable instructions or hardware for accomplishing the functions described herein including determining the parameters described herein and sending and receiving messages between entities (e.g., WTRU and network) to accomplish the described functions. The processes described above may be implemented in a computer program, software, and/or firmware incorporated in a computer-readable medium for execution by a computer and/or processor.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A wireless transmit/receive unit (WTRU) comprising:
   a processor configured to:
   receive a first transmission using a first numerology from a network entity;
   receive an indication associated with the first transmission, the indication comprising a preemption indication and a reference signal (RS) reuse indication, wherein the preemption indication indicates that a portion of the first transmission is preempted and the RS reuse indication indicates whether a RS in the preempted portion of the first transmission can be reused;
   determine whether the RS in the preempted portion of the first transmission can be reused based on the RS reuse indication; and
   decode the first transmission, wherein the first transmission is decoded:
      using the RS associated with the first transmission including the preemption portion on a condition that the RS reuse indication indicates a first value; and
      using the RS associated with the first transmission excluding the preemption portion on a condition that the RS reuse indication indicates a second value.

2. The WTRU of claim 1, wherein on a condition that the RS reuse indication indicates that the RS in the preempted portion of the first transmission cannot be reused, the processor is configured to ignore the RS for channel estimation.

3. The WTRU of claim 1, wherein the first transmission is received in a first slot and the indication is received in a second slot.

4. The WTRU of claim 3, wherein the second slot is a next slot after the first slot.

5. The WTRU of claim 3, wherein the indication is received in a downlink control information (DCI) associated with the second slot.

6. The WTRU of claim 1, wherein the processor is configured to:
   based on a determination that the RS reuse indication indicating that the RS in the preempted portion of the first transmission can be reused, determine a channel estimation function set associated with a level of reuse indicated by the RS reuse indication; and
   perform a channel estimation using the determined channel estimation function set.

7. The WTRU of claim 6, wherein the level of reuse is a first level of reuse or a second level of reuse, and the first level of reuse is associated with a first channel estimation function set and the second level of reuse is associated with a second channel estimation function set.

8. The WTRU of claim 7, wherein the first channel estimation function set comprises a path-loss estimation (PLEST), and the second channel estimation function set comprises the PLEST and a Doppler-timing estimation (DEST).

9. The WTRU of claim 1, wherein the first transmission comprises an enhanced mobile broadband (eMBB) transmission and a second transmission comprises an ultra-reliable low-latency communication (URLLC) transmission.

10. The WTRU of claim 1, wherein a second transmission is superposed in the first transmission using a same numerology.

11. The WTRU of claim 1, wherein the preemption indication indicates that the portion of the first transmission is preempted by a second transmission.

12. A method comprising:
   receiving a first transmission using a first numerology from a network entity;
   receiving an indication associated with the first transmission, the indication comprising a preemption indication and a reference signal (RS) reuse indication, wherein the preemption indication indicates that a portion of the first transmission is preempted and the RS reuse indication indicates whether a RS in the preempted portion of the first transmission can be reused;
   determining whether the RS in the preempted portion of the first transmission can be reused based on the RS reuse indication; and
   decoding the first transmission, wherein the first transmission is decoded:
      using the RS associated with the first transmission including the preemption portion on a condition that the RS reuse indication indicates a first value; and
      using the RS associated with the first transmission excluding the preemption portion on a condition that the RS reuse indication indicates a second value.

13. The method of claim 12, wherein on a condition that the RS reuse indication indicates that the RS in the preempted portion of the first transmission cannot be reused, ignoring the RS for channel estimation.

14. The method of claim 12, wherein the first transmission is received in a first slot and the indication is received in a second slot.

15. The method of claim 14, wherein the second slot is a next slot after the first slot.

16. The method of claim 14, wherein the indication is received in a downlink control information (DCI) associated with the second slot.

17. The method of claim 12, comprising:
based on a determination that the RS reuse indication indicating that the RS in the preempted portion of the first transmission can be reused, determining a channel estimation function set associated with a level of reuse indicated by the RS reuse indication; and
performing channel estimation using the determined channel estimation function set.

18. The method of claim 17, wherein the level of reuse is a first level of reuse or a second level of reuse, and the first level of reuse is associated with a first channel estimation function set and the second level of reuse is associated with a second channel estimation function set.

19. The method of claim 18, wherein the first channel estimation function set comprises a path-loss estimation (PLEST), and the second channel estimation function set comprises the PLEST and a Doppler-timing estimation (DEST).

20. The method of claim 12, wherein the first transmission comprises an enhanced mobile broadband (eMBB) transmission and a second transmission comprises an ultra-reliable low-latency communication (URLLC) transmission.

* * * * *